United States Patent
Wilhelm et al.

[11] Patent Number: 5,114,474
[45] Date of Patent: May 19, 1992

[54] ARRANGEMENT AND METHOD FOR INTRODUCING WASTE MATERIAL INTO A MOLTEN SLAG

[75] Inventors: Ludwig Wilhelm, Engen; Hans Schmidt, Singen, both of Fed. Rep. of Germany

[73] Assignee: Georg Fischer AG, Switzerland

[21] Appl. No.: 656,156

[22] PCT Filed: Aug. 9, 1990

[86] PCT No.: PCT/CH90/00189
§ 371 Date: Apr. 2, 1991
§ 102(e) Date: Apr. 2, 1991

[87] PCT Pub. No.: WO91/02095
PCT Pub. Date: Feb. 21, 1991

[30] Foreign Application Priority Data
Aug. 9, 1989 [CH] Switzerland .............. 2927/89

[51] Int. Cl.⁵ ................................ C21C 5/38
[52] U.S. Cl. ........................................ 75/751; 65/19; 266/157; 423/DIG. 20
[58] Field of Search ............... 266/201, 157; 65/19, 65/20; 75/751; 423/DIG. 20

[56] References Cited
U.S. PATENT DOCUMENTS

| | | | |
|---|---|---|---|
| 1,947,487 | 2/1934 | Newhouse | 266/201 |
| 3,054,139 | 9/1962 | Bartholomew et al. | 65/19 |
| 4,822,388 | 4/1989 | Gee | 65/19 |

Primary Examiner—Melvyn J. Andrews
Attorney, Agent, or Firm—Bachman & LaPointe

[57] ABSTRACT

A method and device for the economic and environmentally safe disposal of waste material and molten slag from a cupola furnace comprises admixing the waste material with either molten slag or granulated slag so as to form a homogeneous mixture of the waste material in the slag material and thereafter feeding the mixture to a collection container.

8 Claims, 1 Drawing Sheet

ARRANGEMENT AND METHOD FOR INTRODUCING WASTE MATERIAL INTO A MOLTEN SLAG

BACKGROUND OF THE INVENTION

The present invention relates to an arrangement for introducing waste material into a molten slag which occurs in a cupola furnace.

Under the environmental protection decrees, which are becoming ever more stringent, particularly high demands are made on the operation of cupola furnaces.

During the smelting process various metals evaporate in the cupola furnace, which metals are contained in the scrap portion, such as, for example, zinc, cadmium, lead, etc., and may no longer be carried away into the open air on account of pollution abatement regulations of the air, but are caught with the aid of a filter unit.

In particular a method is known by which the dust particles as waste material are introduced into a molten furnace slag such that they are fed underneath the slag surface in the slag overflow with the aid of a worm conveyor and are vitrified.

The disadvantage of this method is above all the fact that as a result of the high scrap content during the smelting process the filter dust contains dangerously high zinc values. As the filter dust is now introduced into the slag in the direct vicinity of the slag overflow, as a result of the high zinc contents the lining is attacked and wears. This results in a changed siphon geometry, this being linked with disadvantages for the cupola furnace operation, as with a non-tight siphon the air blast escapes.

Basing considerations upon this prior art, it is the object of the present invention to put forward an arrangement for introducing waste material into a molten slag which occurs in a cupola furnace, with the aid of which arrangement economical, process-reliable and reproducible waste disposal is possible in order to avoid dumping which loads the environment and gives rise to costs.

SUMMARY OF THE INVENTION

The foregoing object is achieved according to the invention in that there is arranged outside the cupola furnace between the slag overflow and a slag-collecting arrangement at least one reaction vessel in which the addition of the waste material to the slag takes place.

BRIEF DESCRIPTION OF THE DRAWING

A preferred exemplary embodiment of the invention is explained in greater detail with the aid of the Figures.

DETAILED DESCRIPTION

Figure 1:
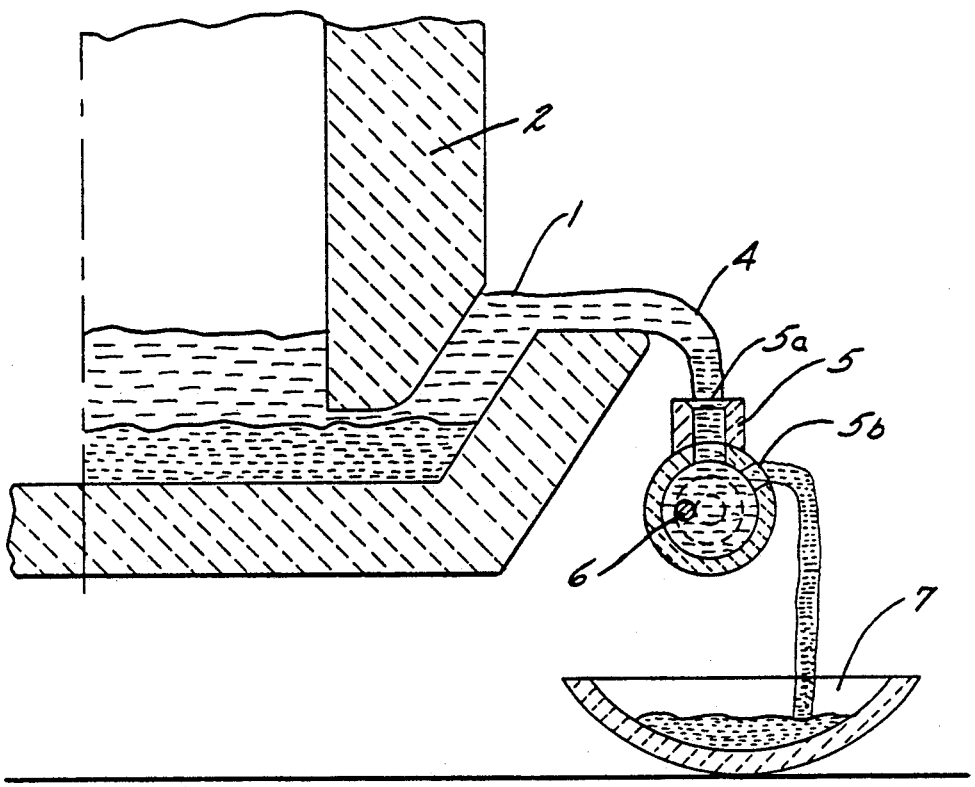

FIG. 1 is a schematic illustration of a first embodiment of the method and device in accordance with the present invention.

Figure 2:
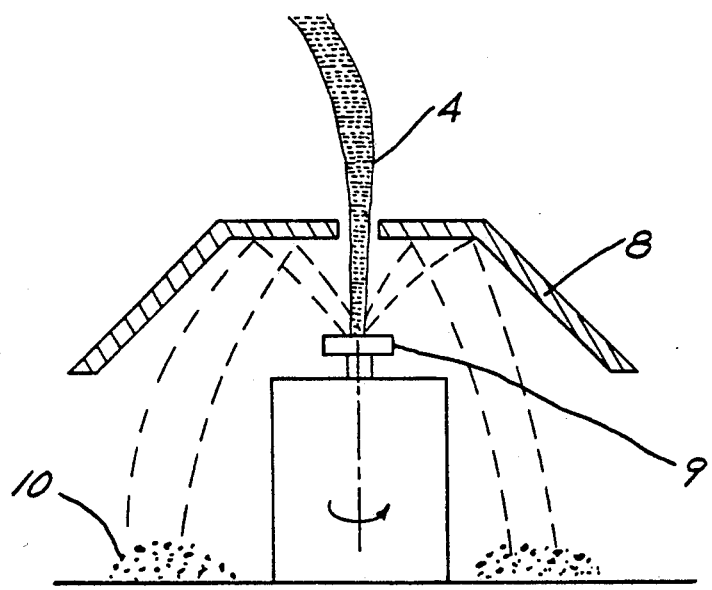

FIG. 2 is a schematic illustration of a second embodiment of the method and device in accordance with the present invention.

A cupola furnace, which is not represented in greater detail, has a slag channel 1 in the siphon 2. The slag 4, which flows off from the tapping channel 1, flows off freely and is collected by a reaction vessel 5. The reaction vessel 5 has a pouring-in opening 5a and a discharge opening 5b from which the slag flows off further into a collecting container 7. The dust-like waste material is introduced into the slag present in the reaction vessel 5 with the aid of a worm conveyor 6. The turbulence present in the reaction vessel ensures that there is good mixing. The vitrification occurs in the reaction vessel 5. The slag which flows off through the exit opening 5b is caught in a container 7.

The slag solidifies in the container 7 to form a compact piece. It is also possible to connect on the output side thereof a granulating plant which is operated with water. Dry granulation of the slag can also occur according to FIG. 2. In this connection, the slag 4 is directed onto a plate 9. The slag portions which have sprayed away from the plate 9 are collected by a deflecting plate 8 and deflected and collected in a vessel, which is not shown, as granulated material 10. The plate 9 can also be arranged so that it rotates in the manner of a centrifuge.

We claim:

1. A method for the economic and environmentally safe disposal of waste material and molten slag from a cupola furnace comprising the steps of:
   siphoning off the slag from a cupola furnace;
   continuously feeding said siphoned slag to a mixing vessel;
   removing waste material from the off gases of said cupola furnace;
   feeding said waste material to said mixing vessel;
   mixing said waste material into said slag in said mixing vessel so as to produce a substantially homogeneous mixture of waste material in said slag; and
   discharging said homogeneous mixture from said mixing vessel to a collection container.

2. A method according to claim 1 including feeding molten siphoned slag to said mixing vessel.

3. A method according to claim 2 including feeding said molten siphoned slag continuously through said mixing vessel from an inlet to an outlet.

4. A device for the economic and environmentally safe disposal of waste material and molten slag from a cupola furnace comprising means for siphoning off slag material from a cupola furnace, feeding means for continuously feeding said siphoned slag to a mixing vessel, waste material recovery means for removing waste material from the off-gases of the cupola furnace, waste material feeding means for feeding the collected waste material to said mixing vessel, mixing means within said mixing vessel for mixing said waste material into said slag so as to produce a substantially homogeneous mixture of waste material in the slag, and means for removing said homogeneous mixture from said mixing vessel to a collection container.

5. A device according to claim 1 wherein said siphoned slag is fed to said mixing container in the molten state.

6. A device according to claim 5 wherein said mixing means includes a worm conveyor for feeding said molten slag continuously from an inlet of said mixing vessel to an outlet of said mixing vessel.

7. A device according to claim 4 wherein said collection container includes a deflecting plate upon which said homogeneous mixture impinges for distributing said homogeneous mixture within said collection container.

8. A device according to claim 7 including means for rotating said deflection plate.

* * * * *